Dec. 23, 1969    E. I. EGID    3,485,422
MACHINE FOR AUTOMATICALLY MANUFACTURING BOWS FROM RIBBONS
Filed May 8, 1967    10 Sheets-Sheet 2
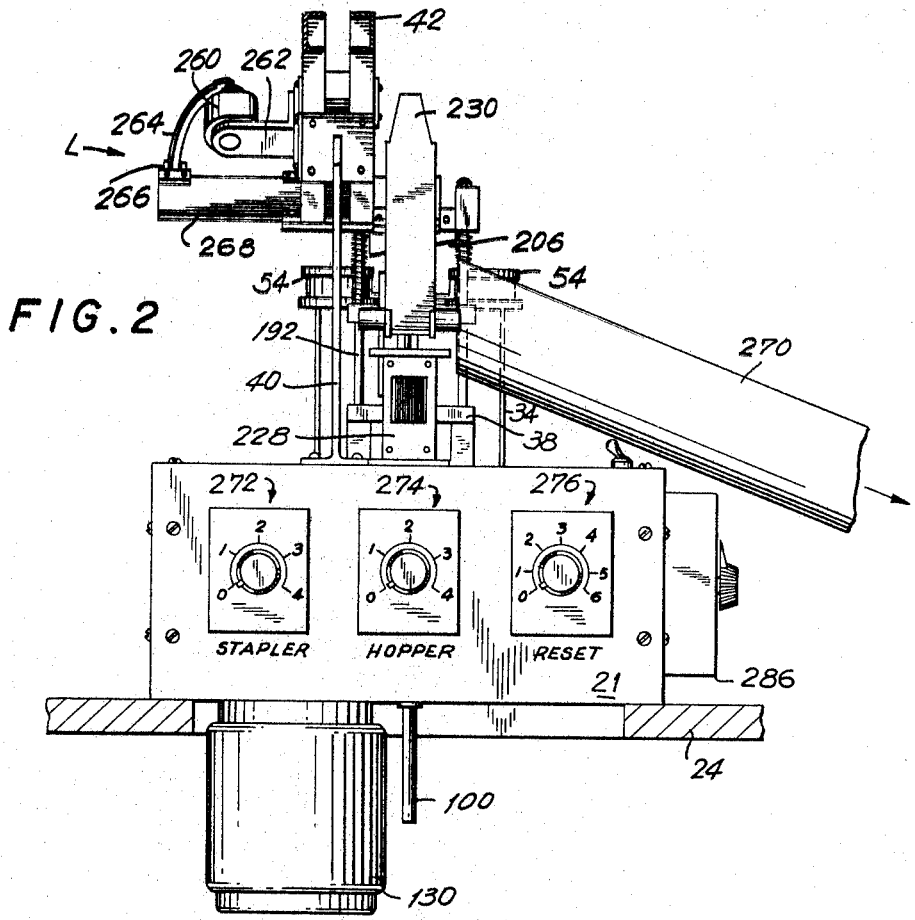
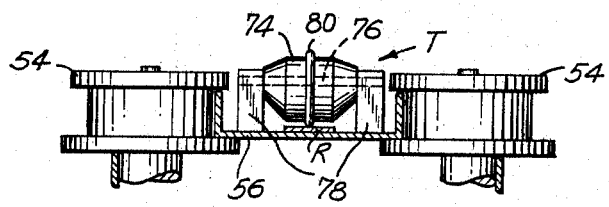
INVENTOR.
EUGENE I. EGID
ATTORNEY

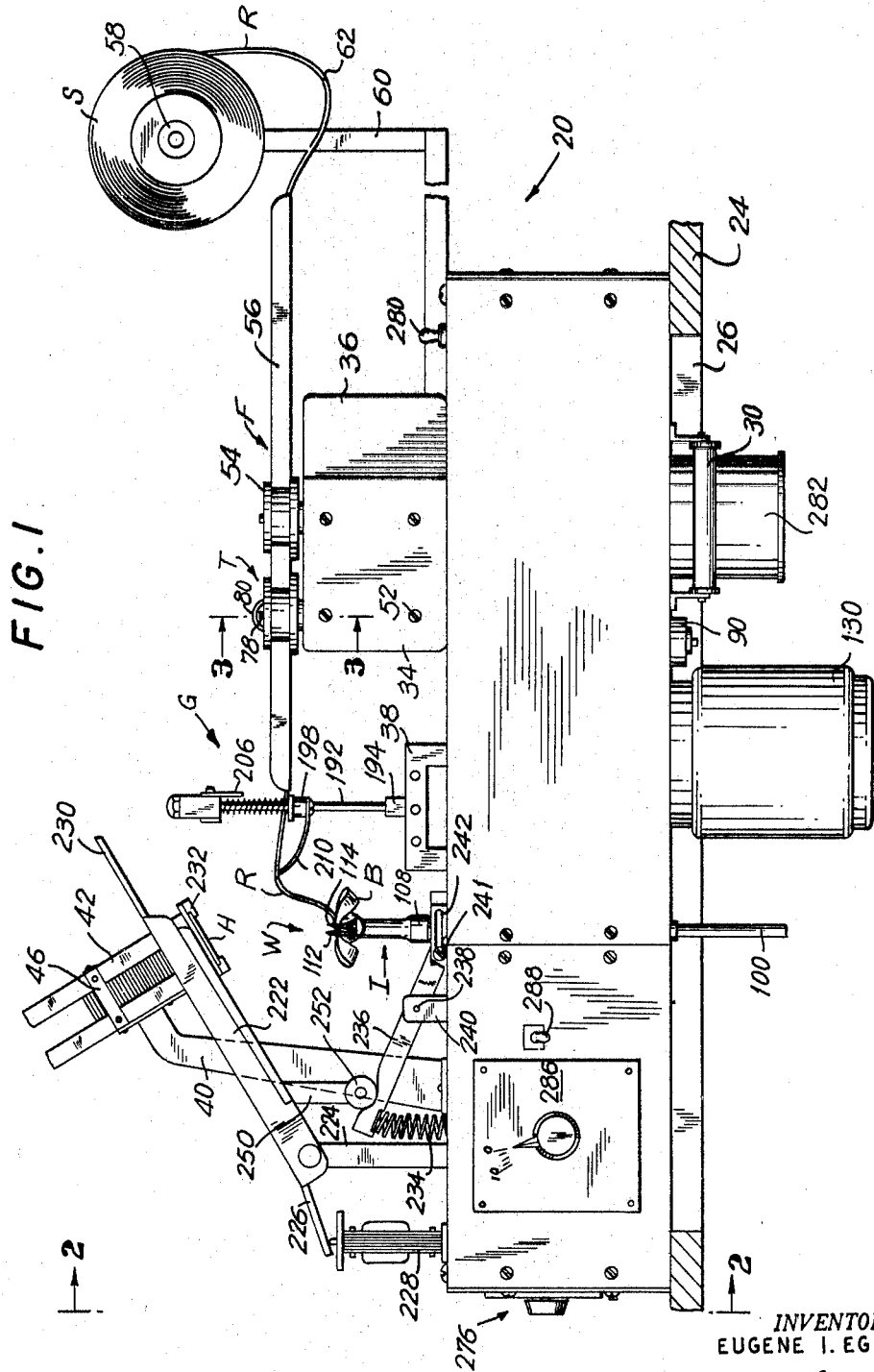

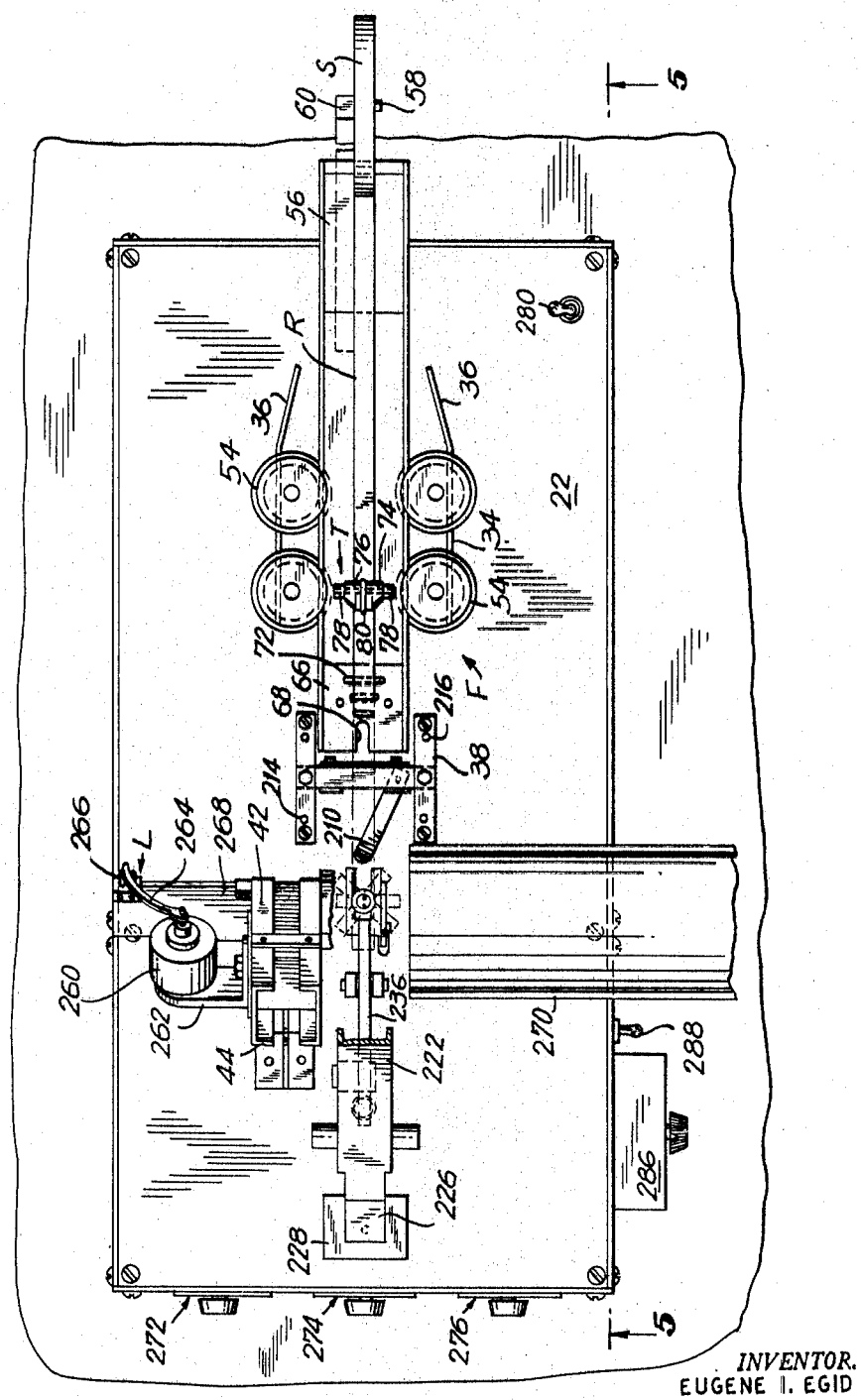

Dec. 23, 1969  E. I. EGID  3,485,422
MACHINE FOR AUTOMATICALLY MANUFACTURING BOWS FROM RIBBONS
Filed May 8, 1967  10 Sheets-Sheet 4

INVENTOR.
EUGENE I. EGID
BY *Percy Freeman*
ATTORNEY

Dec. 23, 1969  E. I. EGID  3,485,422
MACHINE FOR AUTOMATICALLY MANUFACTURING BOWS FROM RIBBONS
Filed May 8, 1967  10 Sheets-Sheet 5

INVENTOR.
EUGENE I. EGID
BY
Percy Freeman
ATTORNEY

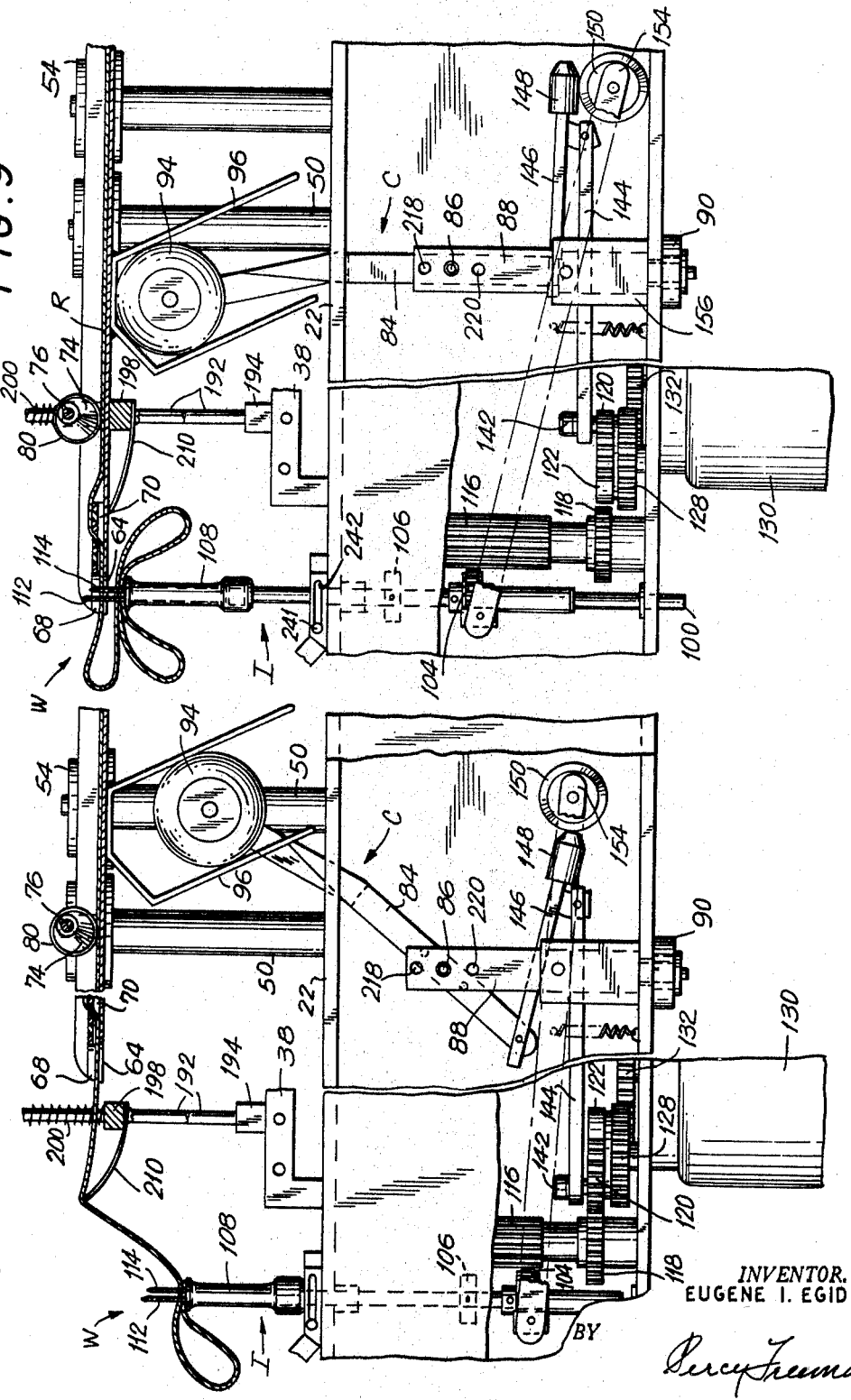

Dec. 23, 1969          E. I. EGID          3,485,422
MACHINE FOR AUTOMATICALLY MANUFACTURING BOWS FROM RIBBONS
Filed May 8, 1967          10 Sheets-Sheet 7
FIG.10
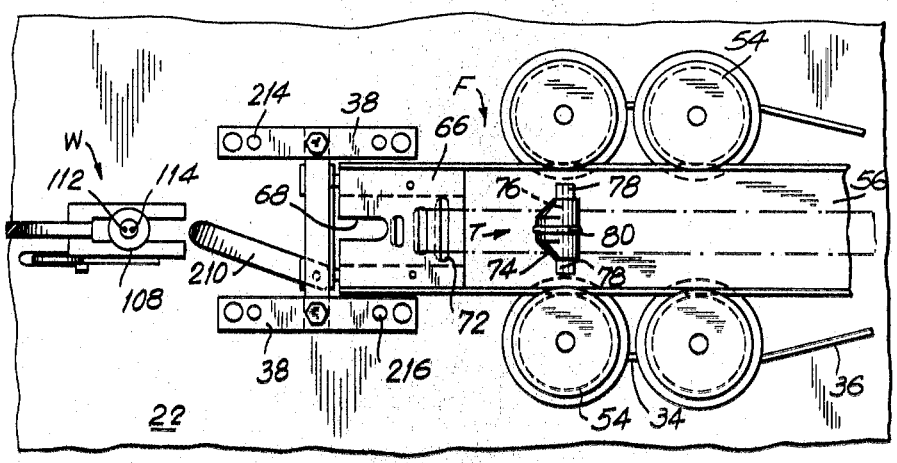
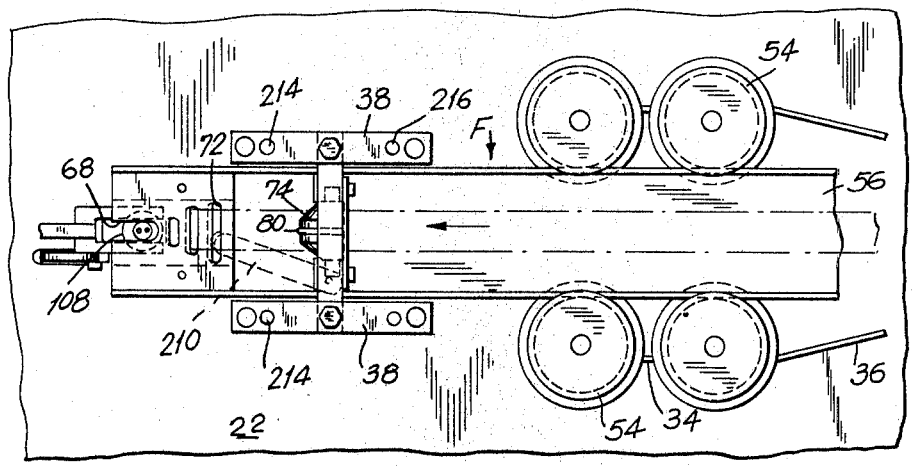
FIG.11
INVENTOR.
EUGENE I. EGID
BY *Percy Freeman*
ATTORNEY

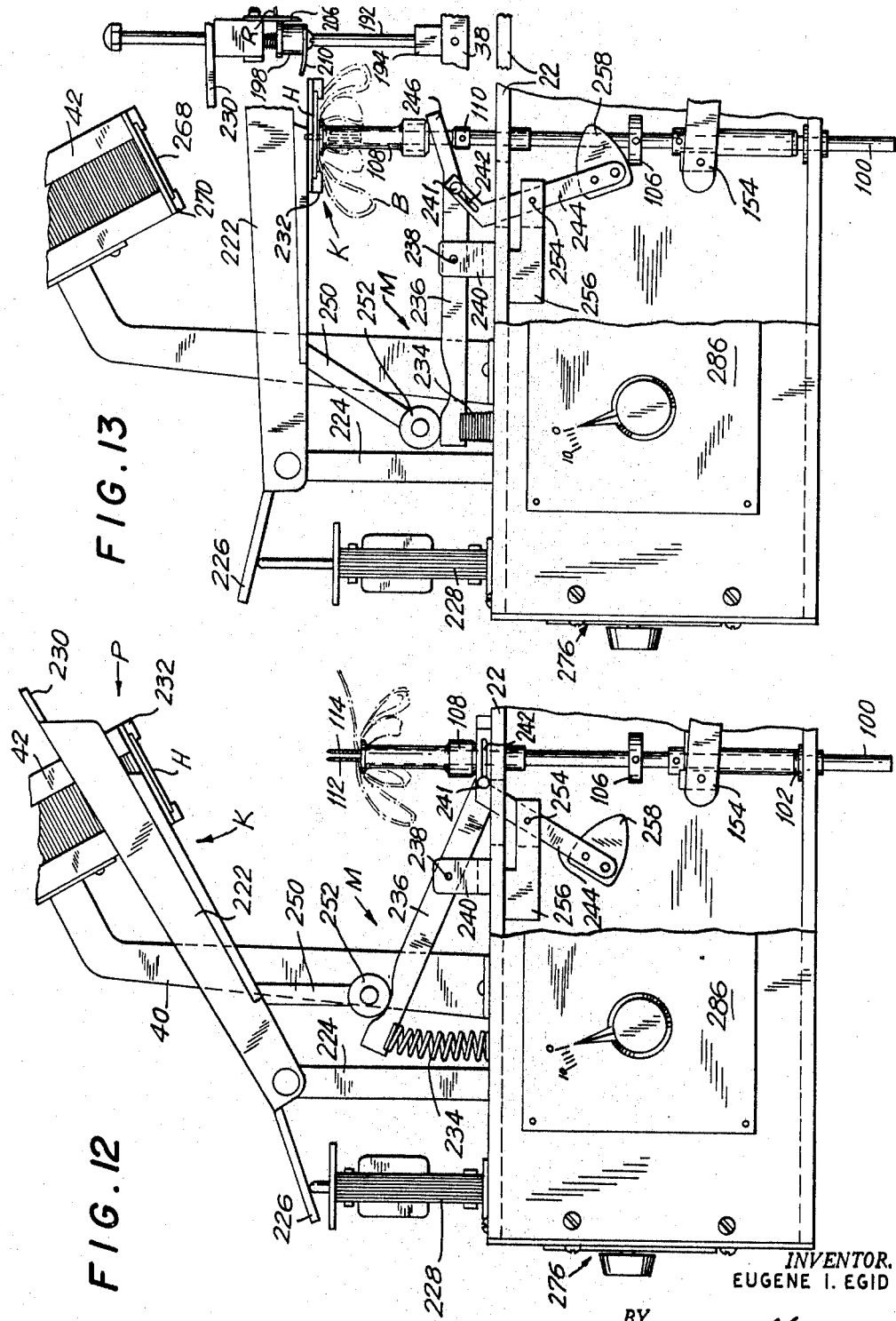

Dec. 23, 1969     E. I. EGID     3,485,422
MACHINE FOR AUTOMATICALLY MANUFACTURING BOWS FROM RIBBONS
Filed May 8, 1967     10 Sheets-Sheet 9
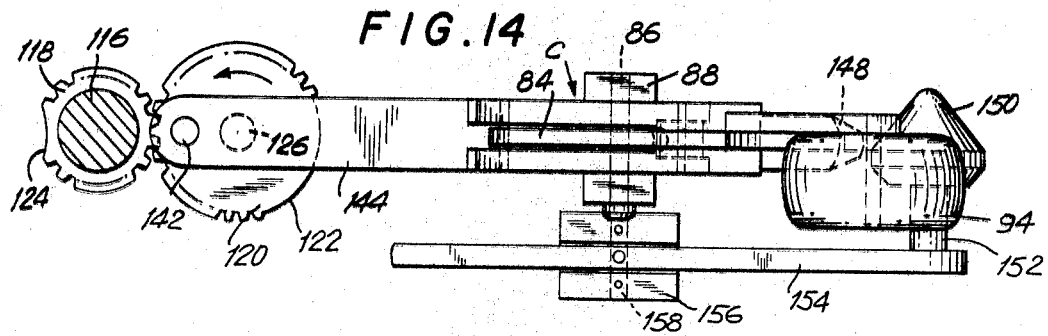
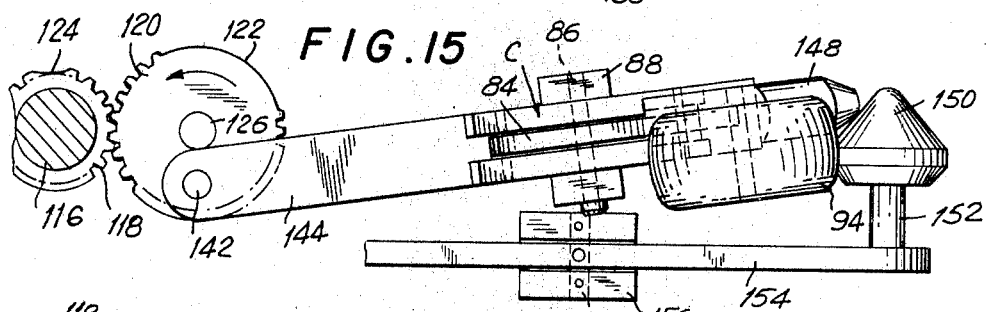
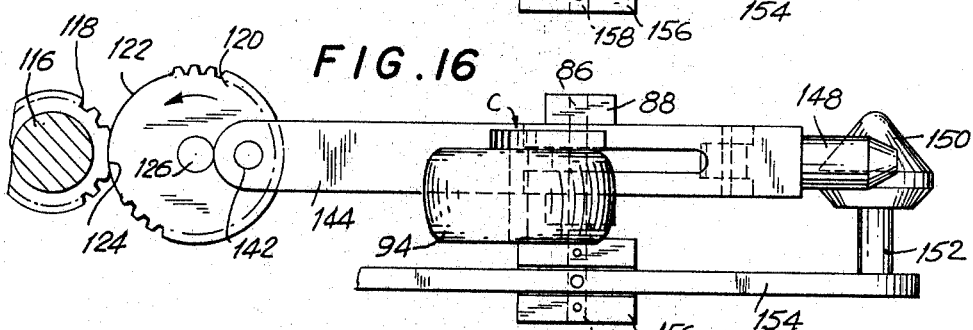
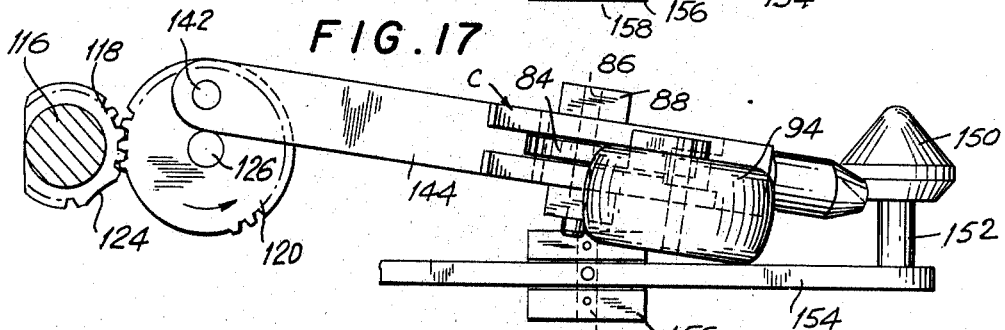
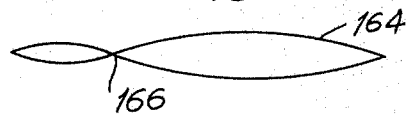
INVENTOR.
EUGENE I. EGID
BY
ATTORNEY

INVENTOR.
EUGENE I. EGID

BY
*Percy Freeman*
ATTORNEY

United States Patent Office 3,485,422
Patented Dec. 23, 1969

3,485,422
MACHINE FOR AUTOMATICALLY MANUFAC-
TURING BOWS FROM RIBBONS
Eugene I. Egid, 1 Short St., Dumont, N.J. 07628
Filed May 8, 1967, Ser. No. 636,686
Int. Cl. A41h 43/00
U.S. Cl. 223—46 30 Claims

ABSTRACT OF THE DISCLOSURE

A machine capable of automatically manufacturing a bow from a flexible ribbon. The machine feeds the ribbon to a working station where the ribbon is impaled on impaling pins carried by an impaling spindle which is reciprocated back and forth along its axis. The ribbon is fed to the working station by a reciprocating feed which advances toward and away from the working station so that during retraction of the feed, the ribbon extends between the impaling spindle and the feed, while during advancing of the feed toward the working station a ribbon loop is formed and is impaled on the impaling spindle. During each retraction of the ribbon feed, the impaling spindle is turned through a given angle, which is less than 360°, so that the successive ribbon bows become angularly distributed about the impaling spindle, thus forming what is known in the trade as a star bow. In addition to being angularly turned, the impaling spindle is axially advanced toward and away from the working station, and when it reaches the working station the impaling spindle pierces a ribbon fed by the feed to the working station. After a given number of ribbon loops have been angularly distributed about the impaling spindle, a bow carrier is placed against the ribbon loops and is fastened thereto, whereupon the bow with the carrier fastened thereto is ejected from the machine. The operations can then be repeated to manufacture the next bow.

Cross reference to related application

A motion-producing mechanism which is disclosed in this application is also disclosed in co-pending application Ser. No. 632,702, filed on Apr. 21, 1967.

Background of the invention

The present invention relates to a machine for automatically manufacturing a bow from a flexible ribbon.

At the present time, while bows of this type are known, to be used in decorative wrappings for packages and the like, the operations involved in the manufacture of these bows are extremely tedious and time-consuming, requiring considerable labor costs as well as considerable skill on the part of personnel who manufacture the bows. As a result, the bows are relatively expensive and are not always manufactured with the precision which might be desired.

Summary of the invention

It is accordingly a primary object of the present invention to provide a machine capable of automatically manufacturing bows from ribbons, so that the labor costs involved will be greatly reduced, thus reducing the cost of the bows.

In particular, it is an object of the invention to provide a machine of this type which is fully automatic and which will have a relatively large output so that a considerable number of bows can be automatically manufactured in a relatively short time.

In addition, it is an object of the present invention to provide a machine which can manufacture bows of different sizes and different types, as well as at different speeds.

Another object of the present invention is to provide an automatic machine of the above type which will operate very smoothly, without any substantial shock or impact among its components, and which will have a very long operating life with practically no maintenance required.

Furthermore, it is an object of the present invention to provide a machine of this type which requires very little power and which is capable of being operated in its entirety from a single motor.

A still further object of the present invention is to provide a machine of the above type which is small and compact, so that it will occupy a relatively small space.

Also, it is an object of the present invention to provide a machine of the above type which is capable of forming bows from flexible ribbons made of almost any desired material including paper, fabric, metals, or combinations thereof, without crinkling or damaging the ribbons in any way, even when they include metallic components.

Yet another object of the invention is to provide a machine capable of forming bows from ribbons of different widths.

Furthermore, it is an object of the present invention to provide a machine capable of forming a bow either with a center loop which covers the front central portion of the bow or capable of forming a bow which carries a decorative center piece.

The objects of the present invention also include the provision of a machine of this type which is capable of fastening the bow to a suitbale carrier therefor and which, in addition, is capable of ejecting the completed bow and the carrier fastened thereto, in preparation for the next cycle of operation during which the next bow will be manufactured.

In accordance with the invention, the ribbon from which the bow is to be manufactured is fed by a feed means to a predetermined working station. A reciprocating means coacts with the feed means for reciprocating the latter toward and away from the working station respectively, along advancing and retracting strokes, and at its forward end position, at tne end of its advancing stroke and the beginning of its retracting stroke, the feed means locates the ribbon at the working station where an impaling spindle means is axially reciprocated to impale the ribbon and thus attach it to the impaling spindle means of the invention. Therefore, during retraction of the feed means, the ribbon extends from the impaling spindle means to the feed means, and during the next advancing stroke of the feed means the ribbon extending between the impaling spindle means and the feed means is formed into a loop which is then impaled on the spindle means. In addition to being axially reciprocated to impale the ribbon whenever the feed means reaches its forward end position, the spindle means is angularly turned, during retraction of the feed means, through an angle which is less than 360°, so that in this way successive ribbon loops are formed on the impaling spindle means and are angularly distributed about the latter. After a given number of ribbon loops have been formed in this way, on the impaling spindle means, a cut-off means cuts off the ribbon from the feed means so that the bow remains on the spindle means separate from the feed means, and then a positioning means positions a bow-carrier in engagement with the bow while a fastening means then fastens the bow-carrier to the bow, after which the completed bow and the carrier fastened thereto are ejected from the machine by an ejecting means which simultaneously acts to deliver another bow-carrier into position to be placed in engagement with the next bow which is manufactured.

Brief description of the drawings

The invention is illustrated by way of example in the accompanying drawings which form part of this application and in which:

FIG. 1 shows in side elevation, one possible embodiment of a machine of the present invention.

FIG. 2 is an end view of the machine of FIG. 1, taken along line 2—2 of FIG. 1, in the direction of the arrows.

FIG. 3 is a transverse section of a feed means of the machine, taken along line 3—3 of FIG. 1, in the direction of the arrows.

FIG. 4 is a top plan view of the machine of FIG. 1.

FIG. 5 being taken along line 5—5 of FIG. 4, in the direction of the arrows.

FIG. 8 is a fragmentary, partly sectional, longitudinal side elevation of the machine showing part of the structure of FIG. 5 as it operates during formation of a bow.

FIG. 9 shows the structure of FIG. 8 during another stage in the operation thereof.

FIG. 10 is a fragmentary top plan view showing the structure at a position corresponding to that of FIG. 8.

FIG. 11 is a fragmentary top plan view showing the structure at a position corresponding to that of FIG. 9.

FIG. 12 is a fragmentary side elevation of the forward part of the machine showing the structure thereof, which is used in connection with removal of a completed bow, shown in phantom lines in FIG. 12.

FIG. 13 shows the structure of FIG. 12 during a stage in the operation thereof subsequent to that illustrated in FIG. 12.

FIGS. 14–17 are respectively top plan views illustrating successive stages in the operation of the drive means.

FIG. 18 is a schematic representation of the motion carried out by part of the mechanism shown in FIGS. 14–17.

Description of a preferred embodiment

Figure 5:
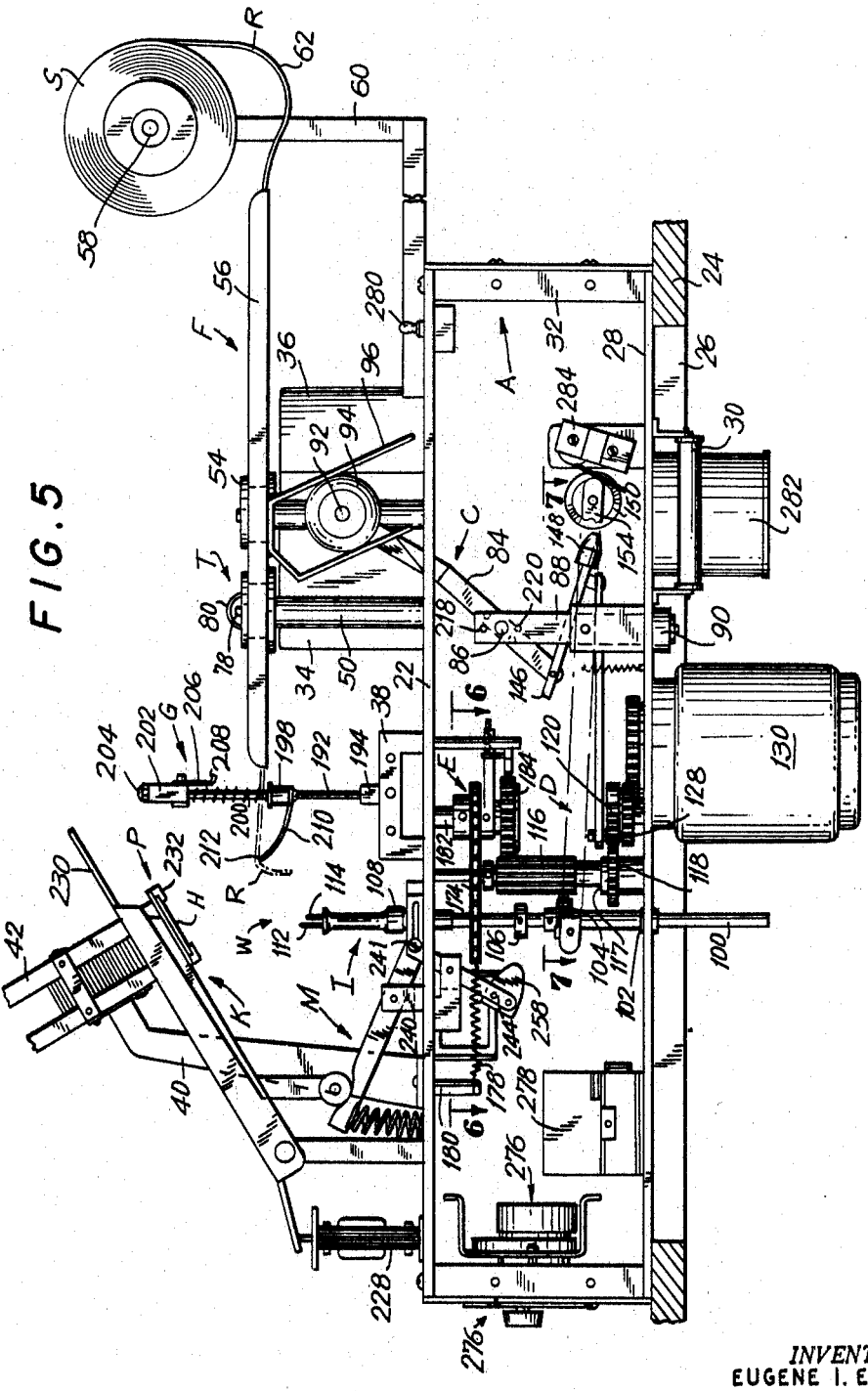
FIG. 5 is a side elevation of the machine showing the latter with covering plates removed.

*General layout.*—The various components of the machine 20 of the invention are carried by a support means formed by a framework A shown in side elevation in FIG. 5. This framework A which carries the various parts of the machine is covered by a plurality of covering plates 22 which are fastened to the various parts of the framework A, by suitable screws or the like, and which are located at the top, the ends, and the sides of the machine. These plates 22 are formed, where required, with openings through which structure extends from the interior space defined by the covering plates 22 to the exterior thereof.

Situated at an upper part of the machine, at the exterior thereof, is a feed means F which feeds a ribbon R from a suitable supply spool S to a working station W. At the working station W, the bow B is formed.

An impaling spindle means I is located at the region of the working station W for axial vertical movement upwardly toward and downwardly away from the working station W. A reciprocating means C coacts with the feed means F (FIG. 5), for actuating the latter to feed the ribbon R from the spool S to the working station W. This reciprocating means C is driven by a drive means D which also serves to turn and axially reciprocate the spindle means I. A center-loop forming means E, shown in FIGS. 5 and 6, coacts with the spindle means I in order to form a center-loop in a manner described below.

A cut-off means G is situated between the feed means F and the spindle means I for cutting through the ribbon R after a bow has been manufactured and impaled on the spindle means I.

As will be apparent from the description below, a bow-carrier H is positioned by a positioning means P on a completed bow, and a fastener means K serves to fasten the carrier H to the completed bow B. An ejector means L is also provided for ejecting the completed bow, and carrier fastened thereto, from the machine, and this ejector means L also serves to feed the next carrier H to the positioning means P.

The positioning means P is actuated by a solenoid and serves to actuate a linkage means M which coacts with the spindle means I during the removal of a completed bow therefrom. The feed means F is provided with a one-way release means T (FIG. 3) which permits the ribbon R to be fed forwardly, toward the left as viewed in FIG. 4, but prevents feeding of the ribbon R rearwardly, to the right as viewed in FIG. 4.

Framework A

Referring to FIGS. 1, 2 and 5, it will be seen that the entire machine 20 of the invention is carried on a table 24, or the like, which is formed with an opening 26 through which various components, referred to below, project. The framework A includes a bottom, base plate 28 made of any rigid metal. The base plate 28 fixedly carries support posts 32 which project upwardly from the plate 28 at the corners thereof and which are formed with openings to receive the screws or the like which serve to fasten the covering plates 22 to the framework in order to house the components carried thereby. A top horizontal plate 22 is fixed to the top ends of the corner posts 32, and this top plate 22 fixedly carries substantially vertical cover plates 34 which have rear ends 36 angled inwardly toward each other. The top horizontal plate 22 carries brackets 38 for the cut-off means G as well as an upwardly directed post 40 which carries a hopper 42 in which a plurality of bow-carrier cards H are situated.

As is apparent from FIGS. 1 and 4, the hopper 42 is formed by a plurality of angle irons 44 interconnected by strips 46, and at one side the hopper 42 serves to mount the ejecting means L, as is apparent from FIG. 4.

The side wall, which is shown most clearly in FIG. 2, serves to carry various adjustable control relays, while the top horizontal wall 22 fixedly carries at its underside various brackets, posts, and the like, on which interior components are mounted, as indicated in FIG. 5. In addition, the covering plates 22 serve to mount various control switches of the machine.

Feed means F

The vertical plates 34 which are fixed to and extend upwardly from the top horizontal plate 22 have fixed to their inner surfaces the vertical posts 50, which may be fixed to the inner surfaces of the plates 34 by screws 52 shown in FIG. 1. At their top ends which project above the plates 34, the posts 50 are of a reduced diameter so as to support for rotary movement, with any suitable bearings, nylon rollers 54. As is apparent from FIG. 4, there are four nylon rollers 54, and as is shown in FIGS. 1 and 5, these rollers 54 are formed with peripheral grooves so as to have upper and lower flanges which support and guide an elongated table 56 of the feed means, this table 56 being of a U-shaped cross section and having upwardly directed side flanges which are received in the grooved peripheries of the guide rollers 54 (see FIG. 3).

It will be noted that the upper flanges of the rollers 54 are of a smaller diameter than the lower flanges so that these lower flanges will provide a secure support for the table 56 which will be reliably retained on the rollers 54 by the smaller upper flanges thereof.

The ribbon R extends along and is supported by the upper surface of the table 56 between the side flanges thereof. The spool S is supported for free rotary movement on a horizontal spool-carrying pin 58 which projects laterally from an upright post 60 fixed to the framework A. The pin 58 itself carries a bearing on which the spool S is mounted so that the latter will turn with very little frictional resistance, so as to maintain between the spool S and the table 56 a free ribbon loop 62 which acts in a manner similar to a breather loop of film in a motion picture camera or projector, for example.

At its forward, left end as viewed in FIG. 4, the table 56 is formed with a longitudinal notch 64, and a ribbon guide 66 covers the table 56 at its forward end, and is formed with a notch 68 which is coextensive with the notch 64. This guide 66 is formed of a plastic, such as methyl methacrylate, and has at its sides, which are adjacent to the flanges of the table 56, downwardly directed flanges engaging the upper surface of the table so that the guide 66, which is fastened to the table in any suitable way, is raised upwardly from and spaced from the upper surface of the table to define with this upper surface a pasage 70 for the ribbon, as is apparent from FIGS. 8 and 9. Moreover, as may be seen from FIG. 4, the ribbon guide 66 is formed with a plurality of transverse slots 72 of various widths, so that a ribbon of a given width will pass through one of these slots, when the upper surface of the guide 66, through the latter to the space 70 so as to then extend forwardly in this space between the notches 64 and 68.

The one-way release means T is in the form of a weight 74 supported for swinging movement on a horizontal pin 76 which extends between and is carried by a pair of posts 78 fixed to and projecting upwardly from the table 56. This weight 74 is an eccentric member, as is apparent from FIGS. 8 and 9, and it projects downwardly and forwardly from the pin 76 on which it is swingable. The weight 74 carries at its exterior an endless friction-ring 80, made of rubber or the like, directly engaging the ribbon R. Furthermore, as is apparent from FIG. 3, the weight 74 tapers downwardly toward its lower end, so that in this way the magnitude of the weight is diminished and it is freely swingable to the position shown in FIGS. 3, 8 and 9, where it engages the ribbon R. Because it engages the ribbon at a location spaced forwardly from the vertical plane in which the axis of the pin 76 is located, the weight 74 will permit the ribbon R to be advanced forwardly along the table 56 but will not permit reverse movement of the ribbon R rearwardly along the table, so that in this way a one-way release means T is provided.

Reciprocating means C

The reciprocating means C includes, as shown in FIG. 5, a swing-lever 84 supported for swinging movement about a horizontal axis by in pin 86, and this pin 86 is carried by a vertical post 88 and extends across a vertical pasage or notch thereof in which the lever 84 swings. The post 88 itself is supported for swinging movement about its own vertical axis by way of a suitable bearing structure 90 carried by the base plate 28 of the framework A. As is apparent from FIGS. 14–17, the swing-lever 84 has a thickness substantially less than the distance between the opposed side walls of the post 88 and is situated midway between these side walls.

At its upper end the swing-lever 84 carries a pin 92 which is fixed to and projects laterally from the lever 84 and which supports for rotary movement, through any suitable bearing, a nylon roller 94 which has a periphery which is convexly curved in a transverse direction, as is apparent from FIGS. 14–17. This roller 94 is received in a fork 96 which is fixed to and projects downwardly from the underside of the table 56, the fork 96 being directed downwarly and rearwardly, as is apparent from FIGS. 5, 8 and 9.

Thus, as the swing lever 84 of the reciprocating means C swings about the horizontal pin 86 which is carried by the walls of the post 88, the roller 94 will move back and forth between the positions shown in FIGS. 8 and 9 so as to advance and retract the feed means F forwardly along an advancing stroke toward the working station W and rearwardly along a retracting stroke away from the working station W.

Spindle means I

The impaling spindle means I includes an elongated spindle member 100 in the form of an elongated metal rod, for example, having successive portions of various diameters and guided for axial reciprocating movement through suitable bearing sleeves 102 carried by the base plate 28 of the framework A and the upper covering plate 22. This spindle 100 fixedly carries a gear 104, and above the gear 104 the spindle 100 fixedly carries a collar 106 for a purpose referred to below.

The upper end of the spindle means I includes, at the exterior of the machine, a sleeve 108 which has a top end wall engaging the top end of the rod 100 while the sleeve 108 is freely movable axially along the rod 100 of the spindle means I. As is shown in FIG. 13, the spindle rod 100 in addition carries a collar 110 which is received in the lower end of the sleeve 108 and which engages a downwardly directed shoulder in the interior of the sleeve 108 to limit downward movment thereof along the spindle rod 100.

Fixed to the top end of spindle 100 and extending upwardly therefrom is a pair of impaling pins 112 and 114 which respectively extend freely through openings in the top end wall of the sleeve 108 when the latter is in its lower position shown in FIGS. 5 and 12. The pin 112 is longer than the pin 114 and has a top pointed end situated at an elevation higher than the top pointed end of the pin 114, so that when the spindle rod 100 is advanced upwardly in order to impale the ribbon R on the pins 112 and 114, the pin 112 will pierce through the ribbon before the pin 114. In this way damaging of the pin by simultaneous piercing thereof by a pair of spaced impaling pins, is avoided. The use of a pair of pins 112 and 114 constrains the impaled ribbon to turn with the spindle means I.

Drive means D

The drive means D includes a rotary elongated splined member 116 which extends parallel to the spindle means I and which is supported for rotary movement in any suitable bearings carried by the base plate 28 and the upper covering plate 22. The rotary splined member 116 meshes with the gear 104 which is fixed to the spindle rod 100. Also, the rotary splined member 116 is coaxially fixed with a motion-transmitting gear 118 which in turn meshes with a second gear 120 of the gear transmission which forms part of the drive means D. As is apparent from FIGS. 14–18, as well as FIG. 7, the gear 120 has gear teeth which do not extend all the way around the periphery of the gear 120. Thus, a peripheral portion 122 of the gear 120 does not have teeth and also a peripheral portion 124 of the gear 118 has no teeth and is adapted to coact with the gear 120 in the manner shown in FIGS. 14–17, achieving an intermittent motion.

The gear 120 is supported for rotary movement by a pin 126 which is fixed to and projects upwardly from the base plate 28 of the framework A, and this gear pin 126 also supports for rotary movement a gear 128 which is of the same size as, and which is situated coaxially beneath the gear 120. The gears 120 and 128 are fixed to each other and form a single unit for rotation together.

Figure 7:
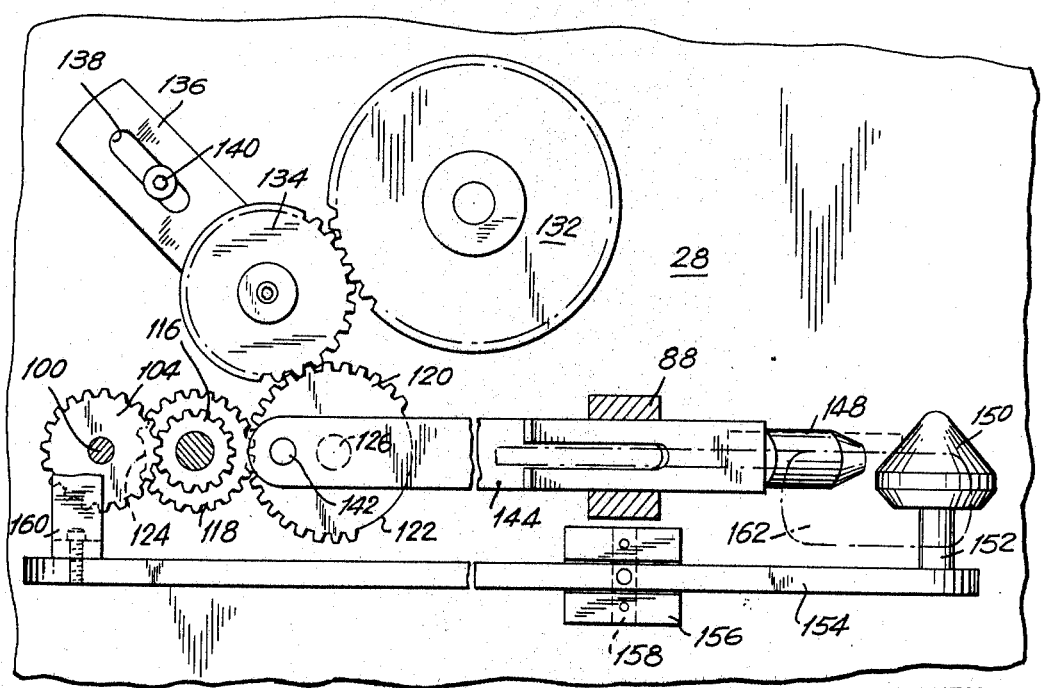
FIG. 7 is a sectional fragmentary plan view, taken along line 7—7 of FIG. 5, in the direction of the arrows, and showing the drive means of the invention.

The entire drive for the machine is taken from a fractional horsepower motor 130 which is fixed to and projects downwardly from the base plate 28 and which drives a gear 132 situated at the upper surface of the base plate 28 and shown most clearly in FIG. 7. This gear 132 meshes with a gear 134 which in turn meshes with the gear 128 so as to transmit to the latter the drive from the motor 130. As may be seen from FIG. 7, the gear 134 is supported for rotary movement on a pin which is carried by a longitudinally shiftable plate 136 formed with a slot 138 receiving a pin 140 which, through a suitable nut and washer, or the like, may be fixed to the upper surface of the plate 28. As a result of this arrangement, it is possible to loosen the plate 136 and replace the gear 134 with a gear of a different diameter so as to provide various driving speeds for the mechanism of the invention.

The gear 120 fixedly carries a crank pin 142 which projects upwardly from the gear 120 and which is spaced from the turning axis thereof so that the crank pin 142 describes a circular path during rotation of the gear 120.

This crank pin 142 passes through an opening of an elongated connecting rod 144 which is guided through the guide passage of the rotary post 88 between the opposed side walls of the latter. At its end which is distant from the crank pin 142, the connecting rod 144 is pivotally connected to an elongated link 146 which is in turn pivotally connected to the swing-lever 84, so that in this way, in response to reciprocation of the connecting rod 144, the lever 84 will swing about the pin 86 to reciprocate the feed means F.

In this way, the drive means serves not only to turn the spindle I about its axis but also to actuate the reciprocating means C so as to advance and retract the feed means F in synchronism with the rotary motion of the spindle means I.

In addition, the drive means D serves to axially reciprocate the spindle means I. For this purpose, the link 146 is provided at its end distant from the swing lever 84 with a rotary tapered roller 148, and this roller coacts with a tapered rotary cone member 150 which is supported for rotary movement on a pin 152 fixed to and projecting laterally from a spindle-actuating lever 154 which is supported for swinging movement about an axis parallel to the axis of roller 150. For this purpose, the base plate 28 carries a bracket 156 (FIG. 7) having a pair of walls which carry a pivot pin 158 which extends through the walls of the bracket 156 and through an opening of the lever 154 so as to support the latter for swinging movement. At its left free end, as viewed in FIG. 7, the lever 154 carries a U-shaped form member 160 which receives in its interior the gear 104 which is fixed to the spindle rod 100, so that during swinging of the lever 154, the fork 160 will act on the gear 104 to raise and lower the spindle rod 100 and thus raise and lower the entire spindle means I.

Because the post 88 is capable of swinging about its own vertical axis, as a result of its mounting in the bearing 90, the roller 148 carried by the link 146 will describe the substantially rectangular closed path 162 indicated in dot-dash lines in FIG. 7. As may be seen from FIG. 7 as well as FIGS. 14–17, during each revolution of the crank gear 120 the roller 148 will first move rearwardly over the roller cone 150 adjacent the front tip end thereof, and will then advance axially along the roller cone 150 in order to move the right end of the lever 154 downwardly, thus moving its left end upwardly to raise the fork 160 and the gear 104 and thus the spindle means I. In this way, the gear 104 moves axially along the splined member 116 while remaining in mesh therewith.

It will be noted that simultaneously the lower end of the swing lever 84 is moved rearwardly so that the roller 94 moves forwardly to advance the feed means F forwardly, thus bringing the ribbon to the working station W. Therefore, simultaneously with the forward advancing stroke of the feed means F, the spindle means I is moved upwardly. After moving axially along the roller 150, the cone 148 passes over the crest of the cone roller 150 and then advances forwardly along the lower part of the path 162 shown in FIG. 7, so that the spindle means I can drop, due to its own weight, to return to its lower end position.

As is apparent from FIGS. 14–16, the gear 120 turns in a counterclockwise direction. Thus, starting from the position shown in FIG. 14, during rotation of the crank gear 120, the connecting rod 144 will move rearwardly and the roller 94 will move forwardly while the roller 148 moves onto the small end of the roller 150. This part of the operation is illustrated in FIG. 15. When the connecting rod 144 has reached the end of its stroke to the right, as viewed in FIGS. 14–16, it will be situated at the location shown in FIG. 16, and the roller 148 has reached the crest of the roller 150 while the roller 94 has reached the end of its forward movement. At this time, the feed means F will be at the end of its advancing stroke and at the beginning of its retracting stroke, while the spindle means I will be at its uppermost position.

Then, while the gear 120 turns from the position of FIG. 16 through the position of FIG. 17, back to the position of FIG. 14, the feed means F is retracted by the rearward movement of the roller 94, and while moving over the crest of the roller 150 the spindle means I will move downwardly due to its own weight, thus raising the roller 150 back to its initial elevation, whereupon the roller 148 again reaches the position of FIG. 14, clearing the roller 150, as is apparent from the path 162 of FIG. 7. These operations will be repeated at the next cycle.

The roller 94 describes during each operating cycle, the closed path 164 indicated in FIG. 18, this path having a pair of closed loops which intersect at the point 166 through which the vertical axis of the post 88 passes, and since the roller 94 is swung both rearwardly and forwardly of the axis of the post 88 it will describe the closed path 164. It should be noted that it is possible to reverse the position of the swing lever 84 so that its upper inclined arm extends upwardly to the right, rather than upwardly to the left, as viewed in FIG. 9, and in this case the roller 94 will be located at all times only on the right of the axis of the post 88, so that only a single loop will be described by the roller with such a construction.

As has been indicated above, the gear 120 is provided with gear teeth only along part of its periphery. These gear teeth extend, for example, through an angle of 225° about the axis of the gear 120, so that the blank portion 122 of the periphery of the gear 120 extends through 135°. As a result of this construction, during turning of the gear 120 from the position of FIG. 14 to the position of FIG. 15, the spindle is rotated from the turning movement of the splined member 116, but just before the connecting rod 144 reaches its rearmost position, which is to say just before the feed means reaches its forward end position, the blank part 122 of the gear 120 reaches the blank part 124 of the gear 118, so that the spindle means I stops turning when the feed means is at its forward end position, and thus the ribbon is at the working station but has stopped moving when the spindle means reaches the upper end of its upward movement to cause the pins 112 and 114 to pierce through the ribbon. Thus, there is no ribbon movement during the actual piercing thereof by the impaling pins 112 and 114.

When the gear 120 turns from the position of FIG. 16 to the position of FIG. 17, the table 56 of the feed means F will be retracted and during the initial part of this retracting movement, the spindle means I also does not turn but simply moves downwardly with the ribbon impaled thereon. Then the teeth of the gear 120 mesh with the teeth of the gear 118 to again start the angular truning of the spindle means, and this angular turning continues during the retracting stroke of the table until it again reaches the position indicated in FIG. 14, where the table is at the end of its retracting stroke. Thus, during the retracting stroke of the feed means, the spindle means I is turned about its own axis through an angle of less than 360°. In the illustrated example, it is turned through an angle of 225°. Thus, during each revolution of the crank gear 120 the spindle means will, on the one hand, be raised and lowered, and will on the other hand, be turned through 225°, and the table or feed means F will remain at its forward end position during movement of the impaling pins 112 and 114 through the ribbon and while the spindle means is in the region of its uppermost elevation.

Center-loop forming means E

Figure 6:
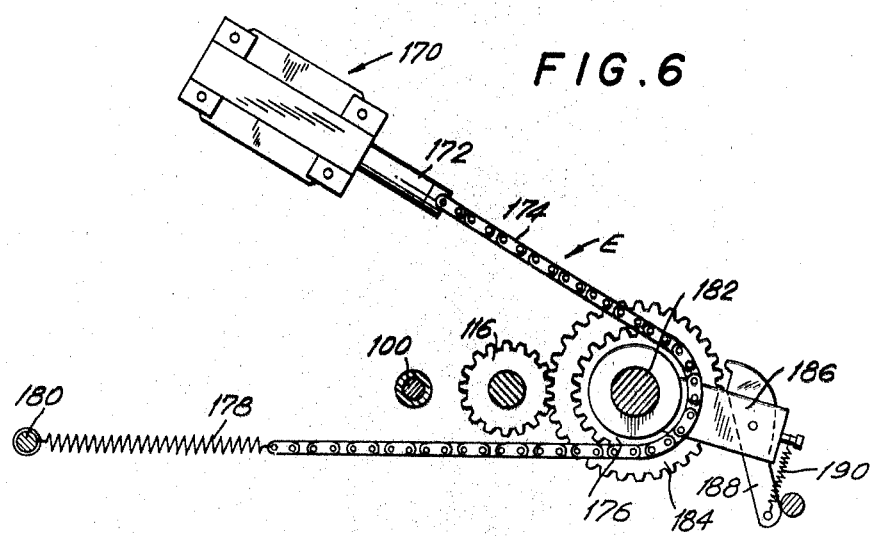
FIG. 6 is a fragmentary sectional plan view taken along line 6—6 of FIG. 5, in the direction of the arrows and showing a center-loop forming mechanism of the invention.

For certain bows, it is desirable to initially form with the machine of the invention, a center loop which will cover the central portion of the bow, and for this purpose the spindle means I is required to turn through a full 360° during formation of the first ribbon loop. For this purpose, the center-loop forming means E is provided. Referring to FIG. 6, this centerloop forming means includes a solenoid 170 fixed to the underside of the top horizontal plate 22 by any suitable bracket. The armature 172 of the solenoid 170 is connected to one end of a sprocket chain 174 which extends around a sprocket wheel 176 and is fixed to one end of a coil spring 178 which is connected distant from the chain 174 to a pin 180 which is fixed to and projects downwardly from the top covering plate 22. The sprocket wheel 176 is supported for rotary movement on a post 182 which is fixed to and projects downwardly from the underside of the top covering plate 22, and a gear 184 is freely turnable on the post 182 and is supported thereon by suitable collars which provide for free rotary movement of the gear 184 while preventing axial movement thereof. Also, suitable collars support the sprocket wheel 176 for free rotary movement while preventing axial movement thereof. The gear 184 meshes with the splined member 116, which is driven in a single direction by the overruning clutch 117 through spur gear 118 to permit the splined member to overrun the motor 130 without interfering with the motor speed.

The sprocket wheel 176 has fixed thereto an extension 186 which pivotally supports a pawl 188 connected to one end of a spring 190 whose opposite end is fixed to a pin projecting from the extension 186. With this construction then the solenoid 170 is energized, the armature 172 thereof is retracted to pull on the chain 174 in opposition to the spring 178, thus turning the sprocket wheel 176 in a counter-clockwise direction, as viewed in FIG. 6, and the pawl 188 at this time will engage the teeth of the gear 184 so as to rotate the latter in a counter-clockwise direction together with the sprocket wheel 176, thus producing a clockwise turning of the splined member 116, as viewed in FIG. 6. However, when the solenoid 170 is deenergized, the spring 178 retracts the armature into the position thereof shown in FIG. 6, turning the sprocket wheel 176 at this time in a clockwise direction, as viewed in FIG. 6, and the pawl 188 at this time will simply ride over the teeth of the gear 184 without turning the latter, so that the splined member 116 will not be turned at this time.

The stroke of the armature 172 is such that when the solenoid 170 is energized, the gear 184 will be turned, in the above example, through 135°, so that in this way, when a center loop is desired, through suitable controls, the solenoid 170 will be energized during the first forward and retracting stroke of the feed means F, and in addition to the turning through the angle of 225° derived by way of the gears 118 and 120, an additional turning of 135° will be provided by way of center-loop forming means E, thus providing for the spindle means a single complete revolution of 360°, forming a center loop which will cover the bow B at its central portion. This actuation of the center-loop forming means E takes place only during the first forward and retracting stroke of the feed means F, so that the center loop is initially formed, and then during the formation of the successive ribbon loops of the box B, the center loop forming means is no longer actuated so that the several ribbon loops will now be angularly distributed about the spindle means I.

Cut-off means G

When a predetermined number of ribbon loops have been impaled on the pins 112 and 114, the bow B will be completed and the cut-off means G will then be actuated, in a manner described below, so as to cut through the ribbon R and thus sever it so that the completed bow can then be removed from the machine. This cut-off means G includes a pair of vertical guide posts 192 fixed to and extending upwardly from a transverse base member 194 carried by the pair of substantially U-shaped bracket members 38. In the position of the parts shown in FIGS. 1, 5, 10 and 11, the posts 192 are centrally carried by the brackets 38. Between their ends the post 192 carry a second transverse cross member 198 on which a stationary, lower guillotine cutter blade is mounted, and it will be noted that the table 56 of the feed means F is capable of moving over this lower stationary blade between the posts 192. A pair of coil springs 200 is respectively coiled about the posts 192 and at their bottom ends engage the transverse cross member 198. The top ends of the springs 200 press against a movable cross member 202 whose upward movement is limited by nuts 204 carried by the top ends of the posts 192, and this cross member 202 carries the movable guillotine cutter blade 206 which at its lower end has a rearwardly directed tail 208 so that the blade 206 will smoothly slide against the lower stationary blade of the guillotine cutter providing a smooth shearing action. The upper blade 206 of the guillotine cutter is lowered in opposition to the springs 200 by a mechanism described below.

The stationary transverse cross member 198 fixedly carries at its underside a springy finger 210 which has an upwardly curved free end 212 across which the ribbon R extends to be supported by the springy finger 210. As a result of this finger 210, the ribbon R is supported so that it will extend from the table 56 over the lower stationary blade of the cut-off means G and will smoothly extend downwardly to the spindle means I, as shown most clearly in FIG. 1, so that in this way even ribbons made of relatively brittle materials, such as ribbons which have metal components, will not be damaged and will be handled delicately and gently by the machine to form perfect loops for the ribbon B. Thus, with this construction during each retracting stroke of the feed means F, the ribbon R will remain in its advanced position extending across the tip of the springy finger 210 to the spindle means I while the table 56 moves rearwardly with respect to the ribbon, and, of course, the one-way release means T will at this time slide rearwardly across the upper surface of the ribbon.

During the forward stroke of the table 56, the one-way release means T will hold the ribbon on the table 56 so that a loop will be formed for the ribbon bow B. Therefore, during each retracting stroke of the feed means F, the ribbon R remains attached to the impaling spindle means I to form the lower part of each bow loop, while during the next advance of the feed means F the upper part of a bow loop is formed, and the ribbon R will advance forwardly over the lower stationary blade of the guillotine cover and over the tip of the finger 210 during the forward movement of the feed means F. During the forward movement of the feed means F, the table 56 advances from the position of FIG. 10 to the position of FIG. 11, thus locating the notch 64 of the table and the notch 68 of the ribbon guide 66 directly over the spindle means at the working station, as is apparent from FIG. 11, and thus when the impaling pins 112 and 114 advance upwardly through the ribbon, the ribbon is engaged at a location within the notches 64 and 68 so that the ribbon is reliably held while it is impaled by the spindle means.

One of the features of the machine of the invention resides in the fact that it is capable of being adjusted to provide bows of different diameters. For this purpose, the brackets 38 have forward openings 214 to receive the member 194 which carries the posts 192 when it is desired to make a ribbon of relatively small diameter, and the brackets 38 have rear openings 216 to receive the lower transverse post-carrying member 194 when it is desired to make ribbons of relatively large diameter. Of course, this will require the feed means F to be advanced and retracted through strokes of different lengths, and, for this purpose, the pin 86 of the swing lever 84 can be removed from the intermediate opening, in which it is shown in the swingable post 88 in FIGS. 5, 8 and 9, and instead, the pin 86 may be located either in upper openings 218 of the post 88 or in lower openings 220 of the post 88, so as to regulate the size of the advancing and retracting strokes of the feed means F and thus match these strokes to the desired ribbon diameter, the cut-off means G also being adjustable in the above-described manner to match the bow diameter which will be provided by the machine. The pin 86 will be located in the upper openings 218 when it is desired to make a bow of relatively small diameter and at this time the posts 192 will be connected to the forward openings 214 of the brackets 38, while when bows of a relatively large diameter are made, pin 86 will be located in the lower openings 220 and the lower member 194 of the cut-off means will be located in the rear openings 216 of the brackets 38.

Positioning means P

The machine of the invention includes a positioning means P, shown most clearly in FIGS. 12 and 13, for positioning the bow-carrier H on a completed bow. The bow carrier H is in the form of a card of rectangular configuration, and a series of these cards are situated within the hopper 42. The positioning means includes a swingable arm 222 pivoted on the top end of a suitable supporting structure 224 which is fixed to and projects upwardly from the upper horizontal plate 22 of the support means. This swingable arm 222 has one end 226 adapted to be actuated by a solenoid 228, and the opposite end 230 of the swingable arm or lever 222 is adapted to engage the upper movable blade of the guillotine-type of cut-off means G for lowering the upper blade 206 thereof simultaneously with the swinging of the arm 222 in a clockwise direction, as viewed in FIG. 12, from the position of FIG. 12 to the position of FIG. 13 when the solenoid 228 is energized. The arm 222 carries the fastening means K, and a pair of guides 232 of the positioning means. These guides are in the form of elongaged angle members of L-shaped cross section, so that they define for each card H a path which is open at both ends of the guides 232. In response to actuation of the solenoid 228, the card H which is carried by the guides 232 will be brought down into engagement with a completed bow, as indicated in FIG. 13.

Fastening means K

The fastening means K is in the form of a stapling unit carried by the swingable arm 222. The arm 222 is maintained in its upper rest position shown in FIG. 12 by the force of a spring 234. This spring engages at its bottom end the upper covering plate 22 and at its top end the underside of a lever 236 of the linkage means M. This lever 236 is supported for swinging movement by a pivot 238 carried by a suitable bracket 240 which is fixed to and extends upwardly from the upper supporting plate 22. At the region of its end which is distant from the spring 234, the lever 236 carries a pin 241 which is slidable in a slot 242 of a second lever 244 of the linkage means M. When the lever 236 is in a substantially horizontal position, as shown in FIG. 13, its end portion distant from the spring 234 is inclined upwardly, as indicated in FIG. 13. This inclined end portion 246 of the lever 236 engages the bottom end of the sleeve 108. The lever 222 fixedly carries a downwardly directed arm 250 provided at its bottom end with a roller 252 which acts on the lever 236 so as to swing the latter in a counter-clockwise direction from the position of FIG. 12 to the position of FIG. 13, when the solenoid 228 is energized.

The lever 244 is itself supported for pivotal movement by a pin 254 carried by a bracket 256 fixed to and extending downwardly from the upper covering plate 22. At its bottom end, the lever 244 carries a cam 258 which swings into engagement with the collar 106 when the solenoid is energized. As is apparent from FIGS. 12 and 13, the swinging of the lever 222 upon energizing of the solenoid 228 will result in raising of the sleeve 108 so that its upper end moves upwardly beyond the impaling pins 112 and 114, these pins being prevented from moving upwardly at this time by engagement of the cam 258 with the collar 106 which is fixed to the spindle rod 100 so as to maintain the latter stationary while the sleeve 108 is displaced upwardly from the position of FIG. 12 to the position of FIG. 13.

As the arm 222 swings downwardly from the position of FIG. 12 to the position of FIG. 13, the stapling device K will drive a staple through the card H which becomes situated against the bow, indicated in phantom line in FIGS. 12 and 13, and at this time the top surface of the sleeve 108 will act as an anvil for the stapling device, serving to clinch the staple legs toward each other thus providing a secure fastening of the card H to the bow.

When the solenoid 228 becomes de-energized, the spring 234 will return the parts from the position of FIG. 13 to the position of FIG. 12, and the completed bow, fastened to the card H which is carried by the positioning means P, will move upwardly with the card H during return of the lever 222 from the position of FIG. 13 to the position of FIG. 12.

It is to be noted that since the end 230 of the lever 222 actuates the cut-off means G simultaneously with the fastening of the carrier H to the bow B, the completed bow is severed from the ribbon from which it was made simultaneously with the fastening of the completed bow to the carrier H, and thus the completed bow, separated from the ribbon R, will return with the arm 222 into the position of FIG. 12.

Ejecting means L

As has been indicated above, the hopper 42 carries at one side thereof the ejecting means L which is shown most clearly in FIGS. 2 and 4. This ejecting means L includes a rotary solenoid 260 mounted on a bracket 262 which is carried at a side surface of the hopper 42. The rotary solenoid 260 has, at its angularly turnable armature, a curved arm 264 which extends between a pair of pins 266 fixed to an edge of a rectangular ejecting plate 268. This ejecting plate is guided for movement at the bottom of the hopper 42, in the guides 270 indicated in FIG. 13, and these guides support the lowermost card H in the hopper in front of the leading edge of the ejecting plate 268. Therefore, when the solenoid 260 is energized, the arm 264 will swing to shift the ejecting plate 268 across the bottom of the hopper, thus displacing the lowermost card out of the hopper and into the guide members 232 of the positioning means P, these guide members being aligned with the bottom end of the hopper so that the plane in which the card H carried by the positioning means P is located, coincides with the plane in which the lowermost card of the hopper is located. As a result, upon actuation of the ejecting means 260, a card will be displaced by the plate 268 from the bottom of the hopper 42 into the guides 232, and this card will itself push out of the guides 232 the card H to which the completed bow has already been fastened in the manner described above. The card H with the completed bow will simply drop into a chute 270, indicated in FIGS. 2 and 4, and the completed bow with the carrier fastened thereto, will simply slide by gravity down the chute 270 to be received in any suitable receptacle or to be received by the operator.

When the rotary solenoid 260 becomes unenergized, its armature swings back to its initial position, thus retracting the plate 268 and permitting the cards in the hopper to move downwardly by an increment equal to the thickness of one card, so that the next card is in position to replace the card carried by the positioning means P after a bow has been attached to the latter card.

Electrical structure

Referring to FIG. 2, the end wall 22 visible therein carries a three time-delay relays 272, 274, and 276, these time-days relays being manually adjustable by way of their knobs so as to be set to respond after preselected time intervals. The time-delay relay 272 will act to energize the solenoid 228, so as to bring about actuation of the fastening means K as well as actuation of the cut-off means G, in the manner described above.

The time-delay relay 274, when it acts after a preselected interval, will energize the rotary solenoid 260. Thus, the energizing of the solenoid 260, in response to actuation of the time-delay relay 274, will result in ejection of a completed bow and card attached thereto as well as in shifting of the next card to the positioning means P.

The time-delay relay 276 will be set at the longest time interval, and, after performance of all of the actions required to manufacture a completed bow which is attached to a card and received in the chute 270, it will bring about resetting of the machine to carry out the next cycle of operation in connection with the next bow. Thus, the relay 276 will have the longest time setting, while the relay 272 will bring about the stapling and cutting off operations and will reset, and the relay 274 will bring about the ejection of the completed bow and will then reset. The machine will start again after the resetting is achieved by the relay 276.

The electrical structure includes, in addition to the various solenoids mentioned above, a stepping switch unit 278, shown in FIG. 5, as well as a toggle switch 280 accessible at the upper rear part of the machine and carried by the upper covering plate 22. The base plate 28 carries the revolution-counting unit 282 and a microswitch 284 which, as indicated in FIG. 5, is actuated by the right end of the lever 154, each time this right end of the lever 154 moves downwardly during the approach of the spindle means I to its uppermost position. As is shown in FIG. 1, there is, at the side of the machine, an adjustable unit 286 capable of being set by the operator to provide a preselected number of operating cycles for the machine during the manufacture of each bow, so that in this way the number of loops in each bow can be selected. Situated beside the unit 286 is a second toggle switch 288 which can be actuated by the operator in order to use the center-loop forming mechanism E when the switch 288 is closed and in order to prevent actuation of the center-loop forming means E when the switch 288 is open.

Figure 19:
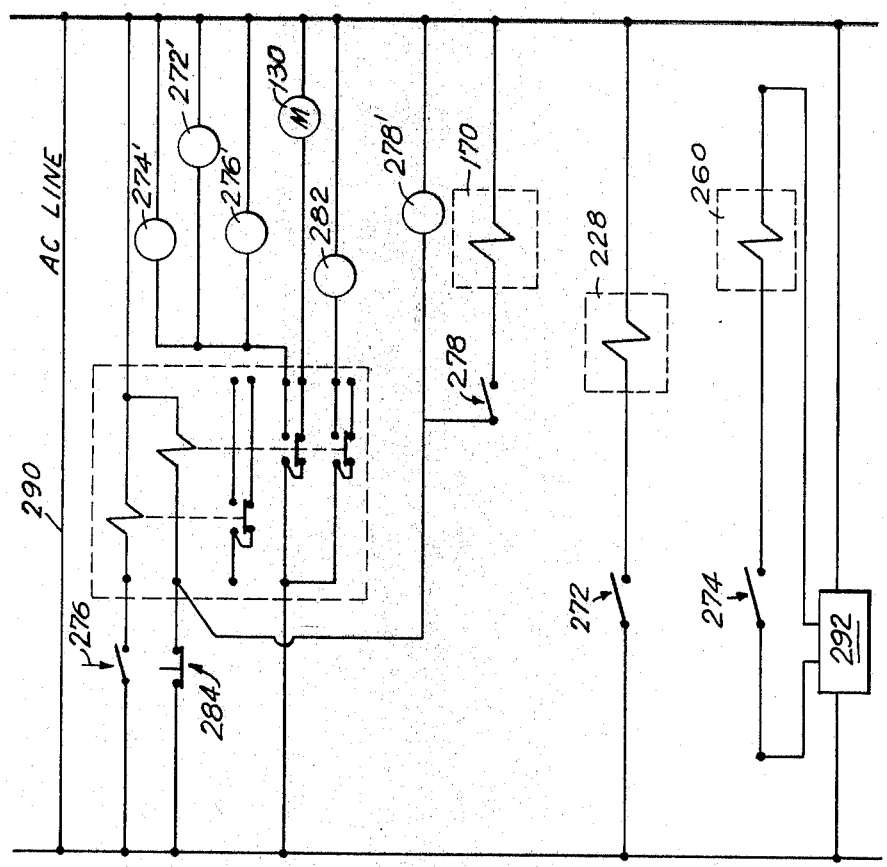
FIG. 19 is a wiring diagram of the electrical structure used with the machine of the invention.

The electrical units referred to above are shown connected together in the wiring diagram of FIG. 19 which also illustrates the AC line 290 and a rectifier 292. Thus, FIG. 19 shows the time-delay relay 272 electrically connected to the solenoid 228, FIG. 19 also showing the coil 272' of this relay. The time-delay relay 274 is also indicated connected electrically with the rotary solenoid 260, and the coil 274' of this relay is also indicated in FIG. 19. The reset relay 276 is also indicated in FIG. 19 together with its coil 276'. The solenoid 170 of the center loop forming means is indicated connected with the stepping switch 278 whose coil 278' is also indicated in FIG. 19. The revolution counter 282 is indicated in FIG. 19 to be actuated by the mechanism illustrated therein, and this counter will count a number of revolutions selected by the selector 286 while the solenoid 170 will only be energized when the switch 288 is closed.

Thus, with this construction, the switch 280 will be closed to start the motor 130, and the machine will thus start operating. Each time the lever 154 moves downwardly at its right end, it causes the microswitch 284 to send a pulse to the stepping relay 278 as well as to the revolution counter 282 so that the counter 282 counts the cycles of operation used for each bow. The second step of the relay 278 will actuate the center loop forming means E by energizing the solenoid 170 whenever the switch 288 has been closed. The several relays 272, 274 and 276 will bring about the operations referred to above. The switch 280 forms the main power switch to energize the motor 130 through the main counter 282. The count switch 284 will be actuated from the lever 154, and on the first count the stepping switch 278 will have its contacts closed so as to bring about energizing of the center loop solenoid 170 for one count only, assuming that the switch 288 has been closed. The counter 282 will be actuated each time a loop of the bow is formed until the predetermined number of loops selected by the unit 286 has been provided. At this point, the counter 282 will reach its position where the predetermined number of counts have been counted out, thus stopping the motor 130 and resetting the stepping switch 278, and at this time the counter 282 will bring about sequential operation of the time-delayed reset timers of the relays 272, 274 and 276. In the event of an emergency stop, the main counter 282 and the time delay reset timers will automatically reset to zero.

Operation of the machine

The manner in which the above-described machine of the invention operates has been referred to at various parts of the above description. The machine can either be used as a production machine for continuously manufacturing bows one after the other, or it may be adapted for coin operation and used as a vending machine where any person desiring a bow will insert a coin to cause the machine to carry through one cycle of operation so as to provide a bow attached to a card in the manner described above. The operator of the machine will provide a spool S on the machine so that there will be available a ribbon R from which the bows are manufactured, and initially this ribbon R is extended along the upper surface of the table 56 of the feed means F and is threaded through that slot of the ribbon guide 66 which corresponds to the width of the ribbon. Then the ribbon is extended over the lower stationary blade of the cut-off means G and is passed over the tip of the springy finger 210 which deflects the ribbon so as to provide for easier formation of the bow loops at a proper forming angle, thus eliminating sharp bends or breaking of fine covering or laminations of special ribbons. Because the table 56 slides in four ball-bearing supported, grooved nylon rollers, the table is given a precise, almost frictionless motion.

The entire machine is actually quite small. A model of the machine which has been used is only two feet long, one foot wide, and ten inches high. Furthermore, it is apparent that the machine, while providing reciprocating motion of various components, nevertheless, operates in a completely shockless and noiseless manner as a result of the harmonic motion derived from the crank mechanism. Thus, this mechanism can run at high speeds without any appreciable wear. In order to regulate the speed, it is only necessary to change the single gear 134, as referred to above in connection with FIG. 7. The one-way release means T insures a smooth flow of the ribbon, and as was mentioned above because the eccentric roller which forms this one-way release means is tapered toward its bottom, forwardly directed end a considerable amount of the weight of this roller is eliminated, but at the same time the locking sensitivity thereof is maintained. The different lengths of the impaling pins 112 and 114 prevent splitting or tearing of fine ribbons. The difference between the lengths of the pins 112 and 114 may be on the order of $\frac{1}{16}$ inch. Thus, the impaling does not take place simultaneously at both impaling pins, but instead there is a time differential between piercing of these pins through the ribbon.

When the switch 288 is moved to its open position so as to prevent energizing of the solenoid 170 and thus prevent operation of a center-loop forming means E, any decorative center may be provided for the bow. Thus, in this case, the operator will place on the top end of the sleeve 108, in a position pierced by pins 112 and 114, any decorative center piece such as a center insert of flowery design or the like, and then the bow is formed in the above-described manner so that its center will be covered by such a center piece instead of by a center loop. The fastening means K will drive the staple through such a center piece instead of through the center loop so that in this way, it is possible to select the design to be given to the central part of the bow.

What is claimed is:

1. In a machine for automatically manufacturing a bow from a flexible ribbon, feed means for feeding a ribbon to a working station, reciprocating means coacting with said feed means for reciprocating the latter first along an advancing stroke toward said station and then along a retracting stroke away from said station, said feed means having a forward end position at the end of said advancing stroke and at the beginning of said retracting stroke thereof and a rear end position at the end of said retracting stroke and at the beginning of said advancing stroke thereof, impaling spindle means for impaling a ribbon at said working station to attach the ribbon to said impaling spindle means, said spindle means having a predetermined axis passing through said station, and spindle drive means coacting with said impaling spindle means for axially reciprocating the latter along said axis toward and away from said working station to impale a ribbon at said working station when said feed means is at said forward end position thereof and for rotating said spindle means around said axis only when said impaling spindle means is in its downward position when said reciprocating means retracts said feed means along said retracting stroke thereof, so that during the successive strokes of said feed means bow loops will be formed from the ribbon and attached to said impaling spindle means.

2. The combination of claim 1 and wherein said feed means is reciprocated by said reciprocating means back and forth along a straight path which is perpendicular to said axis of said spindle means.

3. The combination of claim 1 and wherein said drive means is also operatively connected with said reciprocating means for actuating the latter to reciprocate said feeding means in synchronism with the axial and angular movement of said spindle means for impaling a ribbon on said spindle means when said feed means is at said forward end position thereof and for angularly turning said spindle means during retraction of said feed means.

4. The combination of claim 1 and wherein said drive means coacts with said spindle means for turning the latter through less than 360° during each retraction of said feed means, so that the angular position of said spindle means when said feed means is at said forward end position, at the end of one advancing stroke thereof, is different from the angular position of said spindle means when said feed means is at said forward end position at the end of the next advancing stroke thereof, whereby the ribbon loops impaled on said spindle means will be angularly distributed about the axis thereof.

5. The combination of claim 4 and wherein a center-loop forming means coacts with said spindle means for completing the angular movement thereof through a single revolution when a center loop is to be formed.

6. The combination of claim 4 and wherein a cut-off means coacts with said feed means for cutting through a ribbon after a predetermined number of loops thereof have been impaled on said spindle means.

7. The combination of claim 4 and wherein a positioning means coacts with said spindle means for positioning a bow-carrier on a bow previously impaled on said spindle means after a predetermined number of ribbon loops have been formed on said spindle means.

8. The combination of claim 7 and wherein a fastening means coacts with said positioning means and said spindle means for fastening the bow and bow-carrier to each other.

9. The combination of claim 8 and wherein an ejecting means coacts with said fastening means for ejecting therefrom a bow and bow-carrier which are fastened to each other.

10. The combination of claim 9 and wherein said ejecting means feeds a bow-carrier to said positioning means simultaneously with the ejection of a completed bow and bow-carrier fastened thereto.

11. The combination of claim 1 and wherein said feed means is horizontally reciprocated by said reciprocating means while said drive means raises and lowers said spindle means, the axis of the latter being vertical, and a springy finger situated between said spindle means and feed means in the region of said working station and having an upwardly directed tip across which said ribbon advances during movement to said working station, said springy finger forming a support from which the ribbon extends to said working station.

12. The combination of claim 1 and wherein said feed means is in the form of an elongated table which is longitudinally reciprocated by said reciprocating means and said table having a forward end directed toward said working station, said table carrying at said forward end thereof a slotted plate formed with a plurality of slots through which a ribbon is guided, and said slots being of different widths to accommodate ribbons of different widths.

13. The combination of claim 1 and wherein said feed means includes an elongated table which is longitudinally reciprocated by said reciprocating means, said table having a forward end directed toward said working station and said table being formed at said forward end thereof with a notch extending through said table rearwardly from said forward end thereof, a ribbon which is fed by said feeding means covering said notch and said impaling spindle means extending upwardly through said notch for impaling a ribbon covering the latter.

14. The combination of claim 1 and wherein said feed means includes an elongated table which is longitudinally reciprocated by said reciprocating means, and one-way release means coacting with said table for freeing a ribbon for movement therealong toward said working station while preventing movement of a ribbon with respect to said table rearwardly away from said working station.

15. The combination of claim 14 and wherein said one-way release means includes a weight swingably carried by said table for movement about an axis transverse to the direction of reciprocation of said table, said weight having a lower and extending forwardly from the latter axis toward the working station and engaging a ribbon on the table to prevent retraction of the ribbon rearwardly on the table while freeing the ribbon for movement forwardly with respect to the table toward the working station.

16. The combination of claim 15 and wherein said weight is tapered downwardly toward said forward end thereof.

17. The combination of claim 1 and wherein a cut-off means is situated between said feed means and spindle means for cutting through a ribbon after a predetermined number of ribbon loops have been impaled on said spindle means, said cut-off means including a guillotine cutter having a stationary blade and a movable blade.

18. The combination of claim 17 and wherein a springy finger is carried by said cut-off means in the region of said stationary blade thereof for supporting a ribbon between said spindle means and feed means.

19. The combination of claim 1 and wherein said feed means includes an elongated table which is longitudinally reciprocated by said reciprocating means and which carries a ribbon at one of its faces and has a fork projecting from an opposed face thereof, said reciprocating means including a swing-lever carrying a roller which is situated in said fork, and a post pivotally supporting said swing lever for turning movement about an axis perpendicular to the axis of said post, said post being formed with a guide passage extending therethrough, support means supporting said post for swinging movement about its axis, and said reciprocating means further including a rotary crank carried by said support means for rotary movement and a connecting rod extending from said crank through said guide passage of said post transversely to the latter so that during reciprocation of said connecting rod while said crank rotates said post swings about its axis, and a link extending between and pivotally connected to said connecting rod and said swing lever for swinging the latter during reciprocation of said connecting rod.

20. The combination of claim 19 and wherein said drive means includes a spindle-actuating lever operatively connected to said spindle means for reciprocating the latter along said axis thereof, said spindle actuating lever having between its ends a turning axis perpendicular to said axis of said spindle means, and motion-transmitting means carried by said spindle-actuating lever and said reciprocating means for turning said spindle-actuating lever, to reciprocate said spindle means along said axis thereof, in response to reciprocation of said feed means by said reciprocating means.

21. The combination of claim 20 and wherein said motion-transmitting means includes a first rotary cone carried by said spindle actuating lever distant from said spindle means at the side of said turning axis of said latter lever opposite from said spindle means, said cone having an axis parallel to the turning axis of said spindle-actuating lever, and said motion-transmitting means including a second rotary cone carried by said link at an end thereof which is directed toward said first rotary cone, said second cone having an axis extending longitudinally of said connecting rod and substantially perpendicular to the axis of said first cone, and said second cone, during reciprocation of said connecting rod, engaging said first cone and advancing axially therealong during swinging of said post about its own axis for acting on said first cone to turn said spindle-actuating lever and thus axially reciprocate said spindle means.

22. The combination of claim 21 and wherein said spindle means carries a gear and said spindle-actuating lever has a fork which receives said gear so as to transmit movement of said spindle-actuating lever to said spindle means through said gear carried thereby, a rotary splined member extending parallel to said spindle means and meshing with said gear carried thereby for turning the latter gear while the latter gear and said spindle means move axially parallel to said splined member, and a gear-transmission extending between and operatively connected to said rotary crank and said splined member for rotating the latter while said rotary crank turns.

23. The combination of claim 22 and wherein said gear transmission includes a pair of gears meshing with each other and respectively connected operatively to said splined member and said rotary crank, said pair of gears respectively including at least one gear having teeth which extend through less than 360° about said one gear for turning said spindle means about said axis thereof through less than 360° at each reciprocation of said feed means along said advancing and retracting strokes thereof.

24. The combination of claim 23 and wherein an additional gear meshes with said splined member, and solenoid-actuated means coacting with said additional gear for turning the latter to act on said splined member to turn said spindle means through an angle required to complete a full revolution thereof after said spindle means has been turned through said gear transmission during an advancing and retracting stroke of said feed means, so that through said additional gear a center loop can be formed by rotating said spindle means through a full 360°.

25. The combination of claim 1 and wherein said spindle means has a vertical axis and includes a vertical spindle member and a sleeve mounted on an upper end portion thereof for rotary movement therewith and for axial movement with respect thereto, said sleeve having an upper end wall formed with a pair of openings passing therethrough, and said spindle member carrying at its upper end a pair of impaling pins which respectively extend through said openings at said upper end wall of said sleeve.

26. The combination of claim 25 and wherein said pins are of different lengths and respectively terminate in upper pointed ends located at different elevations.

27. The combination of claim 25 and wherein a linkage means coacts with said spindle member and sleeve thereon for raising said sleeve with respect to said spindle member to an elevation where said upper end wall of said sleeve is situated upwardly beyond said pins after a predetermined number of ribbon loops have been impaled on said pins, so that through said linkage means said sleeve is axially displaced to remove the loops from said pins.

28. The combination of claim 27 and wherein a positioning means coacts with said linkage means for actuating the latter to raise said sleeve with respect to said spindle member and for positioning on a bow raised from said pins by said upward movement of said sleeve, a bow-carrier which engages the bow, and fastening means carried by said positioning means for fastening said carrier to said bow after the latter has been raised upwardly beyond said impaling pins.

29. The combination of claim 28 and wherein said fastening means includes a stapler carried by said positioning means and said upper end wall of said sleeve acting as an anvil for said stapler to clinch together the ends of a staple driven by said stapler through the carrier and the bow on the upper end wall of said sleeve.

30. The combination of claim 29 and wherein said positioning means includes a guide for a card which forms said carrier, a supply hopper carrying a series of cards to be successively delivered to said guide, and solenoid-operated ejecting means for successively feeding cards to said guide while simultaneously ejecting therefrom a card fastened to the bow by the stapler.

References Cited

UNITED STATES PATENTS

| 2,933,223 | 4/1960 | Kravig et al. | 223—46 |
| 2,982,452 | 5/1961 | Anderson | 223—46 |
| 3,223,299 | 12/1965 | Kerrigan et al. | 233—46 |
| 3,396,880 | 8/1968 | Lopata | 223—46 |

MERVIN STEIN, Primary Examiner

GEORGE V. LARKIN, Assistant Examiner